Patented Feb. 25, 1936

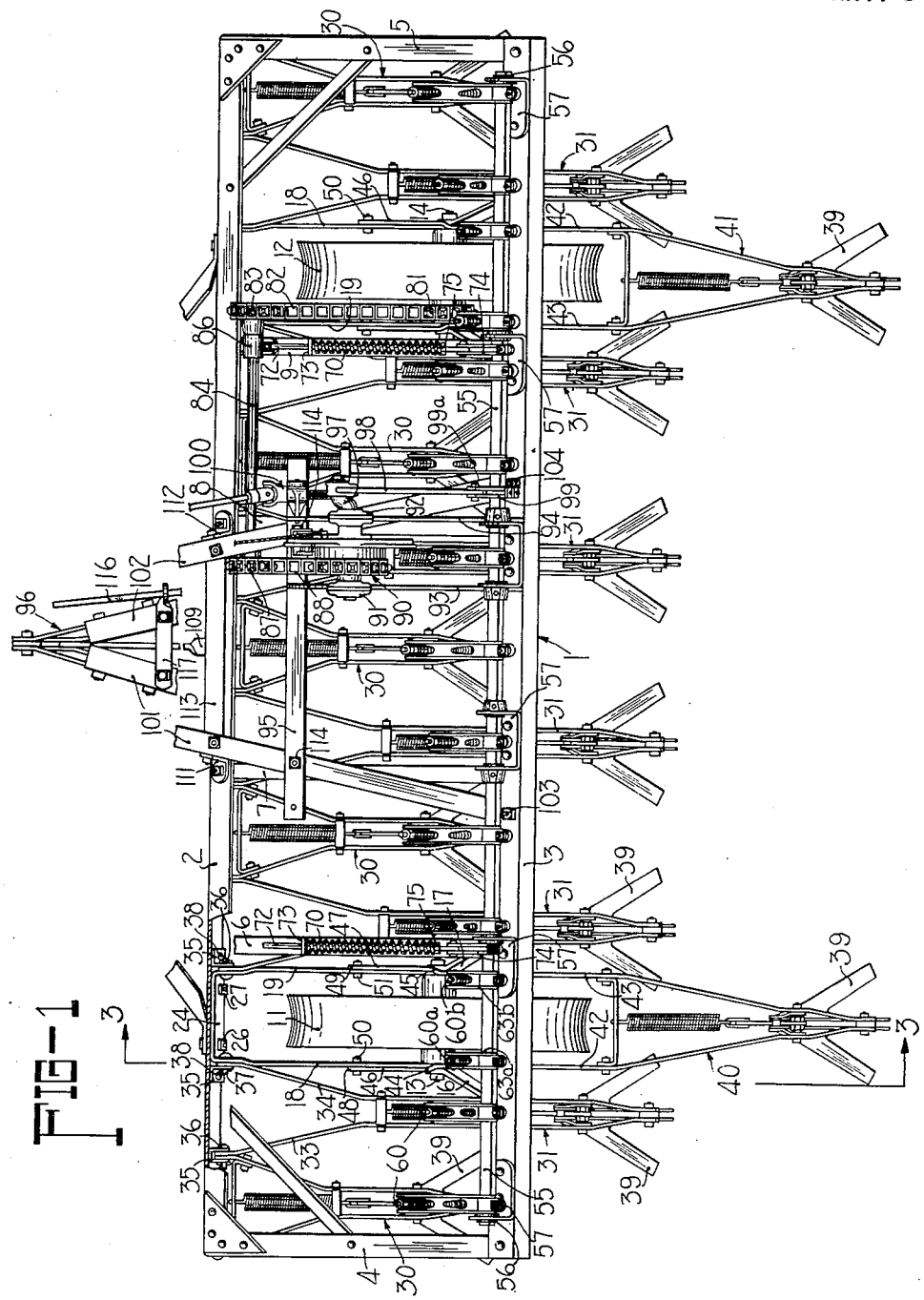

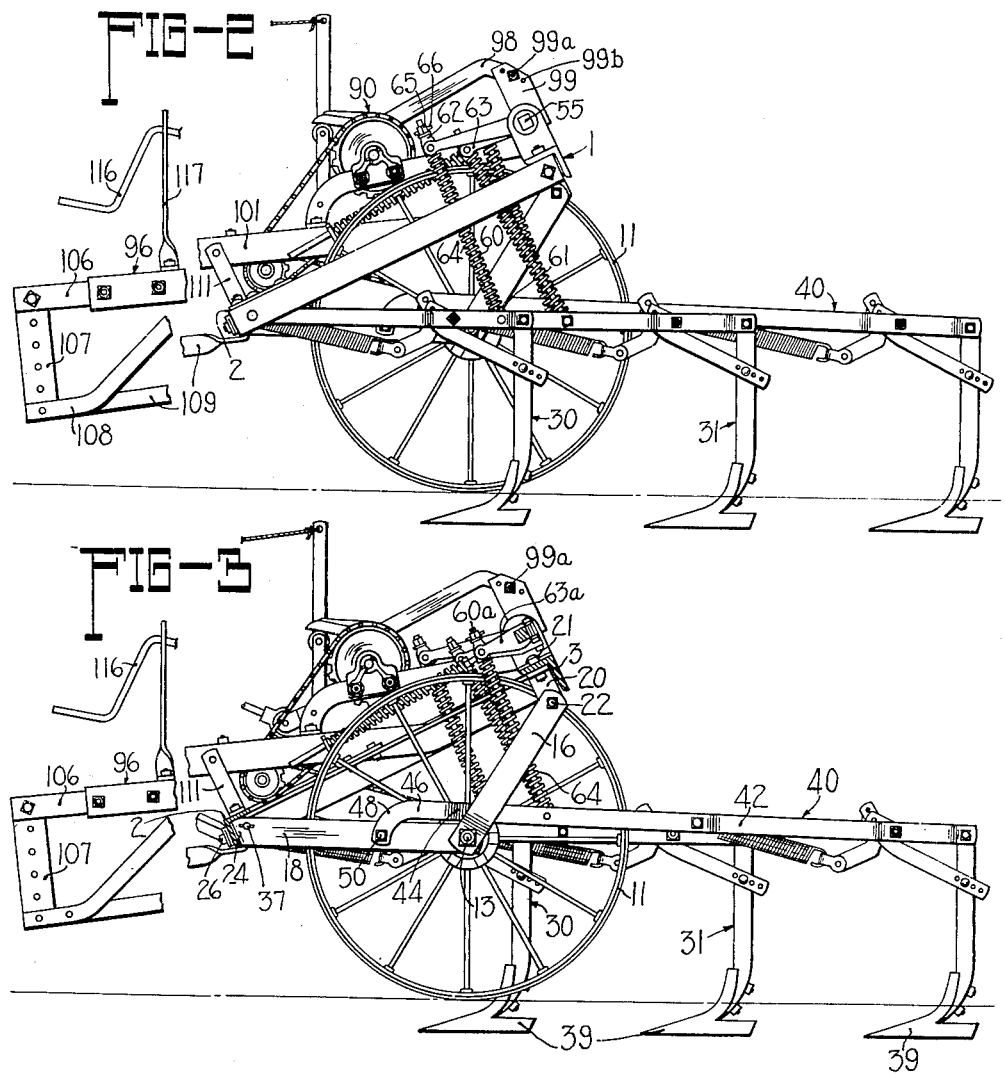

2,032,085

UNITED STATES PATENT OFFICE 2,032,085

CULTIVATOR

Theodore J. Erdman, Horicon, Wis., assignor to The Van Brunt Manufacturing Company, Horicon, Wis., a corporation of Wisconsin Application March 24, 1934, Serial No. 717,165

18 Claims. (Cl. 97—152)

The present invention relates generally to agricultural implements and is more particularly concerned with the provision of a new and improved construction for field cultivators and the like whereby the implement may be operated so as to cultivate the ground up close to fences, trees, ditches and other obstacles. Particularly is it an object of the present invention to provide a field cultivator for such purposes and in which the ground wheels are set in from the ends of the machine so as to provide for the disposition of ground engaging tools laterally outside the supporting wheels, so that all of the ground up to fence lines, trees and other objects can be cultivated.

Another object of the present invention is an improved mounting for cultivator rigs wherein the rigs may be positioned directly in rear of the supporting wheels, whereby all of the ground may be cultivated.

These and other objects and advantages of the present invention will be apparent to those skilled in the art after a consideration of the following detailed description of the preferred construction, taken in conjunction with the accompanying drawings illustrating such construction.

In the drawings:

Figure 1 is a top plan view of a field cultivator embodying the principles of the present invention;

Figure 2 is a side view of the machine shown in Figure 1, looking toward the left hand end of the transversely disposed generally rectangular frame; and Fig. 3 is a section taken approximately along the line 3—3 of Figure 1 and illustrating in particular the connection between the rig which is in rear of the left hand supporting wheel and the frame bars to which the forward end of such rig is connected.

Referring now more particularly to Figure 1, it will be seen that the frame of the implement, indicated in its entirety by the reference numeral 1, is of generally rectangular configuration and consists of transversely disposed front and rear frame members in the form of angle bars 2 and 3 which are connected together at their ends by generally longitudinally disposed end bars or members 4 and 5. The front and rear frame members 2 and 3 are also connected together intermediate their ends, and intermediate supporting wheel means later to be described in detail, by braces or intermediate frame bars 6, 7, 8, and 9. As best indicated in Figures 2 and 3, the rectangular frame 1 is normally disposed in a downwardly and forwardly inclined position.

The frame 1 is supported on two carrying wheels 11 and 12 disposed intermediate the ends of the frame and are journaled on short axles 13 and 14. The axle 13 for the left hand wheel 11 is supported from the frame 1 by means of a pair of laterally spaced downwardly and forwardly converging supports 16 and 17 and by a second pair of laterally spaced rearwardly extending supports 18 and 19 disposed in a generally longitudinally extending plane. The downwardly and forwardly disposed supporting members 16 and 17 are connected at their upper ends to the rear frame member 3 by means of brackets 20. The brackets 20 are preferably secured to the rear frame member 3 by bolts 21 or the like, and the upper ends of the supporting members 16 and 17 are secured to the brackets 20 by bolts 22 or the equivalent. Preferably, the longitudinally disposed and rearwardly extending members 18 and 19 constitute the two arms of a U-shaped member, the base portion or intermediate section 24 of which is connected to the front frame member 2 by bolts 26 and 27. The supporting means for the other carrying wheel 12 at the right hand end of the frame is preferably of the same construction.

The cultivating rigs are preferably pivotally connected with the front frame member 2, and in order to provide for the proper operation of the soil engaging tools, certain of the rigs are longer than others so that the tools are staggered. In the drawings, the short rigs are indicated by the reference numeral 30 and the long rigs are indicated by the reference numeral 31. As best shown in Figure 1, each rig comprises, in general, two forwardly diverging beams 33 and 34 which are pivotally connected to brackets 35, carried by the front frame member 2, by any suitable means, such as pivot bolts 36 and 37. Preferably, the brackets 35 are securely fixed to the frame member 2, as by means of rivets 38 or the like. Each of the rigs carries a soil working tool 39. The particular construction of the rigs so far described and the particular details thereof do not per se form a part of the present invention. Rigs of this type are disclosed and claimed in the copending application of John Schaeffer (case 3), Serial No. 635,158, filed September 28, 1932.

Mention was made above to the fact that the carrying wheels 11 and 12 are set in from the ends of the frame so as to provide for the disposition of soil engaging tools laterally outside said wheels so as to cultivate close to fences, trees and other obstructions. In cases where the supporting wheels are disposed intermediate certain of the tools, it is desirable to mount tools directly in rear of such supporting wheels in order that all of the ground will be cultivated. To this end, therefore, the present invention contemplates the provision of two additional cultivator rigs 40 and 41 which, as best shown in Figure 1, are disposed directly in rear of the wheels 11 and 12, respectively. The rig 40 comprises two beams 42 and 43 which extend forwardly between the downwardly disposed supporting members 16 and 17, and the forward ends of the beams 42 and 43 are offset, as shown at 44 and 45, so as to dispose the end portions 46 and 47 of the beams 42 and 43 outside but adjacent to the generally longitudinally and horizontally disposed wheel supports 18 and 19. In addition, as best shown in Figure 3, the front ends 48 and 49 of the beam sections 46 and 47 are bent downwardly and are pivotally connected for vertical swinging movement to the outer sides of the members 18 and 19 by any suitable means, such as pivot bolts 50 and 51. The right hand rig 41 is of substantially the same construction, and the same reference numerals have been applied in Figure 1. The rearwardly disposed rigs 40 and 41 are also equipped with soil working tools 39. As is obvious, different forms of tools may be used as desired.

Suitable means for raising and lowering said rigs is provided, and preferably such means is so constructed and arranged as to hold the rigs in operative position. The raising and lowering means consists of a transverse rock shaft 55 journaled in bearings 56 supported in brackets 57 which are fixed to the rear frame member 3, as by rivets or the like. The long and short cultivator rigs 30 and 31 are each connected with the rock shaft 55 by means of a rod 60 the lower end of which carries a pivot member 61 pivotally disposed between and connected with the two beams 33 and 34 of the rig, as best shown in Figure 2. A sleeve 62 is provided at the upper end of the rod 60 and is pivotally supported between the forked ends of a forwardly extending arm 63 fixedly secured to the rock shaft 55. The sleeve 62 is slidable vertically along the rod 60, and to keep the sleeve 62 from coming off the upper end of the rod, a collar 65 is mounted on the upper end of the rod 60 and secured in place by a cotter pin 66. Each of the cultivator rigs 30 and 31 is connected to be raised and lowered thru the operation of the rock shaft 55 in the manner just described.

For each of the rearwardly disposed cultivator rigs 40 and 41, two lifting arms are provided, one connected with each of the beams 42 and 43. In Figure 1, this pair of arms as indicated by the reference numerals 63a and 63b, and the outer ends of these arms are connected, respectively, with the beams 42 and 43 by rods 60a and 60b, the lower ends of these rods being pivotally connected to the beams.

Each of the rods 60, 60a and 60b is embraced by a compression spring 64 which encircles the associated rod and which bears at its lower end against the pivot member 61 and at its upper end against the sleeve 62, it being understood that the rods 60a and 60b carry similar sleeves. Looking at Figure 2, when the rock shaft 55 is rotated in a counterclockwise direction, the cultivator rigs are lowered into operating position, the position shown in Figure 2, and are yieldingly urged through the compression of the springs 64 to the desired depth of operation. When the rock shaft 55 is rotated in the opposite direction, the sleeve 62 on each of the rods engages the collar 65 and raises the associated rig to its inoperative position.

To aid in raising the tools suitable counter-balancing springs are provided. In the preferred construction, as illustrated in Figure 1, there are two counter-balancing springs 70, and each spring embraces a push rod 72 disposed in a perforation in a bracket 73. At the left hand end of the machine, the bracket 73 is carried on the intermediate brace member 6 while at the right hand end of the machine the bracket 73 is carried on the brace member 9. The rear end of each of the push rods 72 is pivotally connected to an arm 74 suitably fixed to the rock shaft 55. At one end the counter-balancing spring 70 bears against its associated bracket 73, and at the other end each spring bears against an adjustable abutment collar 75 fixed to the rear end of the rod 72. Thus, whenever the rigs 30, 31, 40 and 41 are lowered the springs 70 are compressed, so that when the rigs are raised the compression of the springs 70 aid in the raising operation.

The mechanism for operating the rock shaft 55 to raise and lower the tools may be hand operated, but preferably, the shaft 55 is rocked by means of power derived from one of the supporting wheels. To this end, the right hand supporting or carrying wheel 12 has been provided with a sprocket 81 and has been arranged to drive, through a drive chain 82, a sprocket 83 fixed to the laterally outer end of a transversely disposed shaft 84, the latter being journaled in bearings 85 mounted on the intermediate brace members 8 and 9. A sprocket 87 is mounted on the inner end of the transverse or jack shaft 84 and is arranged to drive a sprocket chain 88 which, at its rear end, is trained over the sprocket of a half-revolution clutch 90 of conventional construction. Preferably, the power lift clutch 90 is journaled in bearings 91 and 92 mounted on longitudinally disposed intermediate members 93 and 94 which are supported at their rear ends on the rear frame member 3 and, at their forward ends, are carried on a transverse frame member 95 supported on the generally longitudinally arranged draft frame 96. The power lift clutch 90 includes a crank 97 operatively connected with the rock shaft 55 by means of a pitman 98 the rear end of which is connected to an arm 99 by means of a pivot bolt 99a disposed in one of the holes 99b in the upper end of said arm, the lower end of the arm being suitably fixed to the rock shaft 55.

The forward end of the pitman 98 is connected with the crank 97 by means of depth adjusting mechanism 100 of more or less conventional construction.

The implement is propelled by means of the draft frame 96, which comprises rearwardly diverging angle members 101 and 102 connected at their rear ends to the frame member 3 by means of bolts 103 and 104. The forward ends of the draft frame members 101 and 102 are connected by means of straps 106 to a hitching bar 107, as best shown in Figure 2. The hitching bar 107 is disposed vertically and is provided with a number of openings so that the hitch clevis may be disposed in the line of draft. The lower end of the hitch bar 107 is braced to the members 101 and 102 by means of upwardly extending brace bars 108, and the hitch bar 107 is also connected with the front frame member 2 by a rearwardly disposed brace member 109.

Since the draft frame 96 is disposed in substantially horizontal position and since the frame 1 is in an inclined position, the rearmost ends of the bars 101 and 102 are bent upwardly adjacent their attachment with the rear frame member 3, as best shown in Figure 3. This discloses the general plane of the draft frame 96 above the front frame member 2. However, the bars 101 and 102 are connected with the front frame member 2 by means of standards 111 and 112. Also, the members 101 and 102 are braced in a lateral direction by means of cross braces 113, one of which is shown in Figure 1. The supporting member 95, mentioned above, is secured to the members 101 and 102 by means of bolts 114, and the depth adjusting mechanism 100 is controlled by means of a crank 116 supported by means of a bracket 117 carried at the forward ends of the members 101 and 102, which also acts as a cross brace, cooperating with the cross braces 113.

While I have described above the construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. A cultivator comprising a rectangular frame, including transversely extending front and rear frame members and generally longitudinally disposed end members connecting said transverse members, generally forwardly extending members connected at their rear ends to said rear frame member, generally rearwardly extending members connected at their forward ends to said front frame member, said forwardly and rearwardly extending members being disposed at an angle to the plane of said end members, ground engaging supporting means for said frame connected with the adjacent ends of said generally forwardly and rearwardly extending members, and a plurality of cultivator rigs disposed laterally inwardly and outwardly of said ground engaging supporting means and arranged in the same general plane as said rearwardly extending members.

2. A cultivator comprising a downwardly and forwardly inclined rectangular frame, including transversely extending front and rear frame members and generally longitudinally disposed end members connecting said transverse members adjacent the ends thereof, generally forwardly and downwardly extending members connected at their rear ends with said rear frame member intermediate the ends of the latter, substantially horizontal rearwardly extending members connected at their forward ends with said front frame member intermediate the ends thereof, said forwardly and rearwardly extending members being disposed at an angle to the plane of said end members and said front and rear frame members and spaced laterally an appreciable distance inwardly of said end members, ground engaging supporting means for said frame disposed intermediate the ends of the latter and connected with the adjacent ends of said generally forwardly and rearwardly extending members, and cultivator rigs connected with said frame laterally outwardly of said ground engaging supporting means.

3. A cultivator comprising a rectangular frame, including transversely extending front and rear frame members, laterally spaced generally longitudinally extending supports connected to said frame members and disposed inwardly from the ends of said frame, supporting wheels for said frame journaled on said supports and a plurality of cultivator rigs connected at their forward ends with said frame and including one rig disposed rearwardly of each of said supporting wheels, each of said last named rigs being connected to said supports.

4. A cultivator comprising a rectangular frame, including transversely extending front and rear frame members and generally longitudinally disposed end members connecting said transverse members, generally forwardly extending members connected at their rear ends to said rear frame member, generally rearwardly extending members connected at their forward ends to said front frame member, ground engaging supporting means for said frame connected with the adjacent ends of said generally forwardly and rearwardly extending members, soil engaging tools connected with said front frame member and disposed laterally inwardly and outwardly of said ground engaging supporting means, and other soil engaging tools disposed rearwardly of said supporting means and connected with certain of said generally forwardly and rearwardly extending members.

5. A cultivator comprising a rectangular frame, including transversely extending front and rear frame members and generally longitudinally disposed end members connecting said transverse members, generally forwardly extending members connected at their rear ends to said rear frame member, generally rearwardly extending members connected at their forward ends to said front frame member, supporting wheel means for said frame connected with the adjacent ends of said generally forwardly and rearwardly extending members, soil engaging tools connected at their forward ends to said front frame member and disposed laterally inwardly and outwardly of said supporting wheel means, and other soil engaging tools disposed rearwardly of said supporting means and including laterally spaced bars embracing said wheel means and connected with certain of said generally forwardly and rearwardly extending members.

6. A cultivator comprising a downwardly and forwardly inclined rectangular frame, including transversely extending front and rear frame members, two pairs of laterally spaced downwardly extending wheel supports connected to the rear frame member and disposed inwardly from the ends of said frame, a wheel axle disposed between the two supports of each pair, a longitudinally extending support disposed between the lower end of each downwardly extending support and the front frame member, a carrying wheel mounted on each axle, a series of cultivator rigs pivotally connected to the front frame member, means disposed on the rear frame member for raising and lowering said cultivator rigs, another cultivator rig disposed directly in rear of each of said supporting wheels and having forwardly extending beams disposed on opposite sides of the supporting wheel and extending between the downwardly extending supports of the supporting wheel and pivotally connected to the two associated longitudinally extending supports, and a connection between the latter rigs and the raising and lowering means.

7. A cultivator comprising a rectangular frame, including transversely extending front and rear frame members and generally longitudinally disposed end members connecting said transverse members, generally forwardly extending members connected at their rear ends to said rear frame member intermediate the ends of the latter, generally rearwardly extending members connected at their forward ends to said front frame member intermediate the ends thereof, said forwardly and rearwardly extending members being disposed at an angle to the plane of said transverse and end members, supporting wheel means for said frame connected with the adjacent ends of said generally forwardly and rearwardly extending members, intermediate bars connected with said front and rear transverse members and disposed intermediate said supporting wheel means, a transverse shaft journaled on certain of said intermediate bars, means for driving said shaft from one of said supporting wheel means, power lift mechanism operatively connected with the other end of said transverse shaft, a series of cultivator rigs pivotally connected to the front frame member, means disposed on the rear frame member for raising and lowering said cultivator rigs, and means for driving said last named means from said power lift mechanism.

8. A cultivator comprising a downwardly and forwardly inclined rectangular frame, including transversely extending front and rear frame members, two pairs of laterally spaced downwardly extending wheel supports connected to the rear frame member and disposed inwardly from the ends of said frame, a wheel axle disposed between the two supports of each pair, a longitudinally extending support disposed between the lower end of each downwardly extending support and the front frame member, a carrying wheel mounted on each axle, a series of cultivator rigs pivotally connected to the front frame member, means including a transverse rock shaft rotatably mounted on the rear frame member for raising and lowering said cultivator rigs relative to said frame and its carrying wheels, and means including a power lift mechanism operated from one of said carrying wheels for actuating said rock shaft.

9. A cultivator comprising a downwardly and forwardly inclined rectangular frame, including transversely extending front and rear frame members, two pairs of laterally spaced downwardly extending wheel supports connected to the rear frame member and disposed inwardly from the ends of said frame, a wheel axle disposed between the two supports of each pair, a longitudinally extending support disposed between the lower end of each downwardly extending support and the front frame member, a carrying wheel mounted on each axle, a series of cultivator rigs pivotally connected to the front frame member, a rock shaft journaled on the rear frame member and operatively connected with said cultivator rigs for raising and lowering the same, a transverse shaft journaled for rotation on said rectangular frame and having its laterally outer end operatively connected to be driven by one of said carrying wheels, a draft frame comprising generally longitudinally extending bars connected at their rear ends with said rear frame member, means connecting said bars with said front frame member, and power lift mechanism including parts carried by said draft frame and operatively connected to be driven from the laterally inner end of said transverse shaft and operative to actuate said rock shaft for raising and lowering said cultivator rigs.

10. A cultivator comprising a downwardly and forwardly inclined rectangular frame, including transversely extending front and rear frame members, two pairs of laterally spaced downwardly extending wheel supports connected to the rear frame member and disposed inwardly from the ends of said frame, a wheel axle disposed between the two supports of each pair, a longitudinally extending support disposed between the lower end of each downwardly extending support and the front frame member, a carrying wheel mounted on each axle, a series of cultivator rigs pivotally connected to the front frame member, a plurality of intermediate frame bars connecting said front and rear frame members and disposed adjacent the wheel supports secured thereto, means including a rock shaft journaled on the rear frame member for raising and lowering said rigs, and spring means carried by said intermediate bars and connected with said rock shaft to aid in raising said rigs.

11. A cultivator comprising a rectangular frame, including transversely extending front and rear frame members and generally longitudinally disposed end members connecting said transverse members, generally forwardly extending members connected at their rear ends to said rear frame member, generally rearwardly extending members connected at their forward ends to said front frame member, ground engaging supporting means for said frame connected with the adjacent ends of said generally forwardly and rearwardly extending members, said supporting means being disposed within said rectangular frame member and laterally inwardly of the end members thereof, soil engaging tools connected with said front frame member and disposed laterally inwardly and outwardly of said ground engaging supporting means, and soil engaging tools connected with said rearwardly extending members.

12. A cultivator comprising a rectangular frame, including transversely extending front and rear frame members and generally longitudinally disposed end members connecting said transverse members, generally forwardly extending members connected at their rear ends to said rear frame member, generally rearwardly extending members connected at their forward ends to said front frame member, supporting wheel means for said frame connected with the adjacent ends of said generally forwardly and rearwardly extending members, soil engaging tools connected at their forward ends to said front frame member and disposed laterally inwardly and outwardly of said supporting wheel means, and other soil engaging tools disposed rearwardly of said supporting means and including laterally spaced bars embracing said wheel means and connected to react against said rearwardly extending members.

13. An agricultural implement comprising a frame having front and rear frame members, generally forwardly and downwardly extending members connected at their rear ends to said rear frame member, generally rearwardly extending members connected at their forward ends to said front frame member, said forwardly and rearwardly extending members being disposed at an angle to the plane of said frame, ground engaging supporting means for said frame connected with the adjacent ends of said generally forwardly and rearwardly extending members, and an operating unit disposed directly in rear of each of said supporting means and having forwardly extending members disposed on opposite sides of the supporting means and extending between the downwardly and forwardly extending members and pivotally connected with the associated rearwardly extending members.

14. A cultivator comprising a frame having front and rear transverse frame members, intermediate downwardly and forwardly extending frame bars connected with said front and rear transverse members, a draft frame consisting of a pair of generally longitudinally extending draft members connected at their rear ends with said rear transverse frame member and disposed substantially horizontally, generally upwardly extending standards connecting the front transverse member with said longitudinally extending draft members, and ground engaging supporting means disposed inwardly of the ends of said front and rear frame members.

15. A cultivator comprising a frame having front and rear transverse frame members, intermediate downwardly and forwardly extending frame bars connected with said front and rear transverse members, supporting wheel means for said frame disposed laterally inwardly of the ends thereof and having an axis of rotation below said intermediate frame bars, a draft frame consisting of a pair of generally longitudinally extending draft members connected at their rear ends with said rear transverse frame member, power lift mechanism operatively connected with at least one of said supporting wheel means and including a transverse shaft journaled on certain of said intermediate frame bars for rotation about an axis disposed below said draft members and above said intermediate frame bars, a series of cultivator rigs pivotally connected to the front frame member, means disposed on the rear frame member for raising and lowering said cultivator rigs, and means for driving said last named means from said power lift mechanism.

16. A cultivator having a forwardly inclined frame comprising a front member and a rear member connected by longitudinally extending members, carrying wheels for said frame, a plurality of cultivator rigs connected with said frame, a draft beam comprising forwardly converging members and connected at their rear ends to the rear member and to the front member by means of upwardly extending supports, the draft members being connected together adjacent the front member by a connecting member, a transverse shaft journaled on certain of the longitudinally extending members and operated from one of the carrying wheels, a power lift clutch supported on longitudinal members connected at their rear ends to the rear transverse member and at their front ends to the connecting member, and a rock shaft journaled on the rear frame member and actuated by said clutch for lifting the rigs.

17. A cultivator comprising a frame having front and rear transverse frame members, intermedate downwardly and forwardly extending frame bars connected with said front and rear transverse members, a draft frame consisting of a pair of generally longitudinally extending draft members connected at their rear ends with said rear transverse frame member and disposed substantially horizontally, generally upwardly extending standards cennecting the front transverse member with said longitudinally extending draft members, ground engaging supporting means disposed inwardly of the ends of said front and rear frame members, a plurality of cultivator rigs operatively connected with said frame and disposed both laterally inwardly and outwardly of said ground engaging supporting wheels, power lift mechanism supported on the rear portions of said draft members and operatively connected with said cultivator rigs for raising and lowering the same, and means for driving said power lift mechanism from one of said ground engaging supporting means.

18. A cultivator comprising a frame having front and rear transverse frame members, intermediate downwardly and forwardly extending frame bars connected with said front and rear transverse members, a draft frame consisting of a pair of generally longitudinally extending draft members having their rear ends bent upwardly and connected with said rear transverse frame member, the forward portion of said draft frame being disposed substantially horizontally, generally upwardly extending standards connecting the front transverse member with said longitudinally extending draft members, ground engaging supporting means disposed inwardly of the ends of said front and rear frame members, power lift mechanism operatively connected to be driven by one of said ground engaging supporting means, a plurality of cultivator rigs connected with said frame and raised and lowered by said power lift mechanism, and means for supporting said mechanism comprising a pair of generally longitudinally extending supporting members connected at their rear ends with said rear transverse frame member and having their forward ends bent downwardly and connected with said generally longitudinally extending draft members.

THEODORE J. ERDMAN.